June 14, 1960　　　M. S. BROMFIELD　　　2,940,094
CONVEYOR FOR USE IN MANUFACTURE OF SHOES
Filed May 21, 1958　　　　　　　　　　　　2 Sheets-Sheet 2

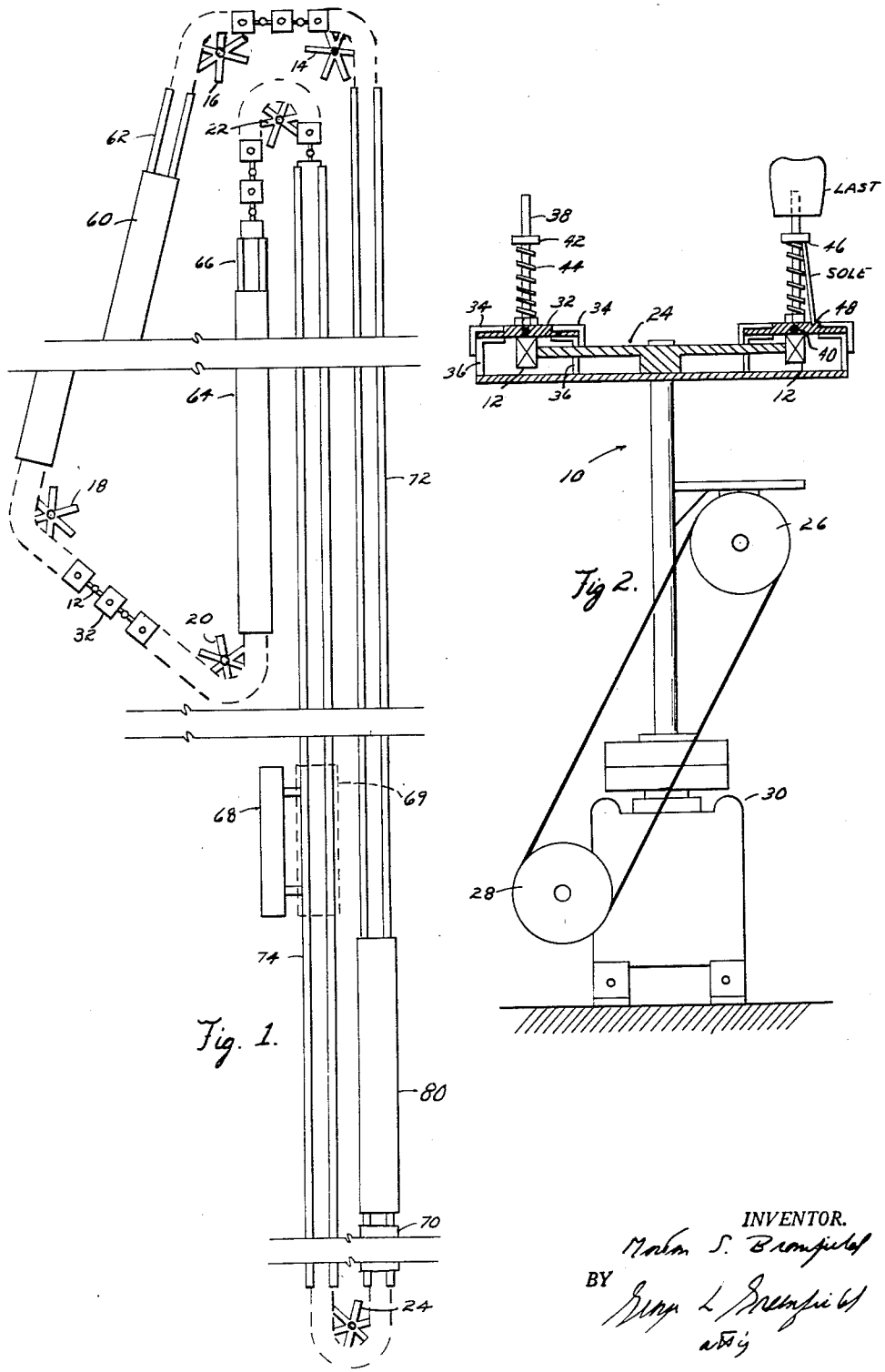

INVENTOR.
Morton S. Bromfield
BY George L. Greenfield

United States Patent Office 2,940,094
Patented June 14, 1960

2,940,094

CONVEYOR FOR USE IN MANUFACTURE OF SHOES

Morton S. Bromfield, Hubbard St., Canton, Mass.

Filed May 21, 1958, Ser. No. 736,914

7 Claims. (Cl. 12—1)

This invention relates to the manufacture of shoes and more particularly comprises a new and improved conveyor system used in shoe assembling operations.

In my copending application Serial No. 667,988 filed June 25, 1957 I disclose a method of sole laying which employs heat in a novel manner both to improve shoes having cemented soles and reduce the time consumed in the manufacturing cycle. In my copending application filed herewith, I disclose a method of making shoes which employs heat and is related to the lasting as well as the sole laying operations. Each of these methods may be practiced with great advantage on the conveyor system forming the subject matter of the instant case.

Briefly, the method disclosed in the copending application filed herewith is used in the manufacturing of shoes on a continuous rink system. That is, uppers received from the stitching room are treated one at a time by a number of operators who perform one or a few functions on the shoe during the manufacturing cycle. Particularly, shoe uppers are mulled one at a time and passed thereafter one at a time to the various lasting operators. Thereafter, the lasted uppers are subjected one at a time to a heater which conditions the shoe for cementing and at least partially dries the mulled upper. After the cement is coated on the upper bottom, a second application of heat is applied to evaporate the cement solvents and complete the drying of the upper. Thereafter, the sole is applied and the shoe finished. In my earlier application, the sole attaching steps set forth above are described.

In each of the methods, it is desirable to couple a time factor to each of the operations. This lends to the manufacturing process a degree of control not otherwise available. That is, by controlling the heating, mulling, and drying times forming part of the manufacturing process, shrinkage of the upper and setting up of the cement is precisely controlled.

One important object of my invention is to provide a conveyor system about which are arranged a number of stations for the complete assembling of a shoe. Still another important object of my invention is to reduce the cost of shoe manufacturing.

Another important object of my invention is to reduce radically the number of lasts required in a shoe factory while at the same time increasing the factory output.

Another important object of my invention is to provide a device which presents to an operator both the upper and the sole to be attached to it in the proper condition and as they are needed for the operator to perform his particular function in the process.

Yet another important object of my invention is to reduce the amount of space required for a particular output of shoes in a factory.

Another important object of my invention is to provide a machine used in the shoe making industry which encourages uniformity of operation both by operators and equipment used in the process.

Another important object of my invention is to reduce radically or eliminate the damage to shoes normally incurred in the manufacturing cycle.

Still another important object of my invention is to force operators to invest a given amount of time in each shoe which they process. This control over the time spent by each operator in manufacturing shoes precludes hasty and poorly executed work which is common under piece rate incentive systems used in the industry.

Yet another important object of my invention is to provide a conveyor system for use in the shoemaking process which establishes a set condition for all of the parts of the shoe assembled on the conveyor.

To accomplish these and other objects, my invention includes several novel features. The entire shoe assembling process is arranged about an endless conveyor. The conveyor includes an endless belt upon which are mounted at regular intervals upstanding posts which are adapted to fit into recesses formed in the cone portions of lasts. Each of the posts is adapted to carry one such last. At the first station of the conveyor, a stitched upper is placed on the belt and carried through a heater. This heater serves at least two very important functions. First, it raises the temperature of all of the uppers to be processed on the conveyor to the same level regardless of the temperature in the factory or the weather conditions outside. In a similar manner, the heater reduces the moisture content of the leather or other material from which the upper is made so that each upper at least approaches a standard condition. As still another function, the heater prepares the upper for mulling. By raising the temperature of the air pockets between the leather fibrils the upper may absorb moisture at a more rapid rate.

After the upper has been preheated for a preselected period of time, it is subjected to steam or water vapor in a muller. Thereafter, as the conveyor chain moves along the support, the upper is assembled on a last and carried from one operator to the next on the pin. After the upper has been fully assembled, and before the bottom is coated with cement, the lasted upper is directed through a second heater which serves two very important functions. First, it stores heat in the upper bottom to hasten the setting and drying of the cement later applied to the bottom, and in addition, the heat begins the drying of the moisture within the upper introduced by the muller. After heating, the bottom is coated with cement, reheated, and thereafter cooled before the sole is layed. The reheating of the upper cooperates with the heat stored in the upper to hasten the evaporation of the cement solvents and in addition completes the drying of the upper. This forced drying rapidly shrinks the upper and causes it to form an intimate fit on the last. The shoe is completed by mounting the heel and finishing.

These and other objects of my invention along with its incident advantages will be better understood and appreciated from the following detailed description of one embodiment thereof, selected for purposes of illustration and shown in the accompanying drawing in which:

Figure 1 is a plan view, partially diagrammatic, of a conveyor system constructed in accordance with my invention;

Figure 2 is a side elevation view of the conveyor shown in Figure 1; and

Figure 3:
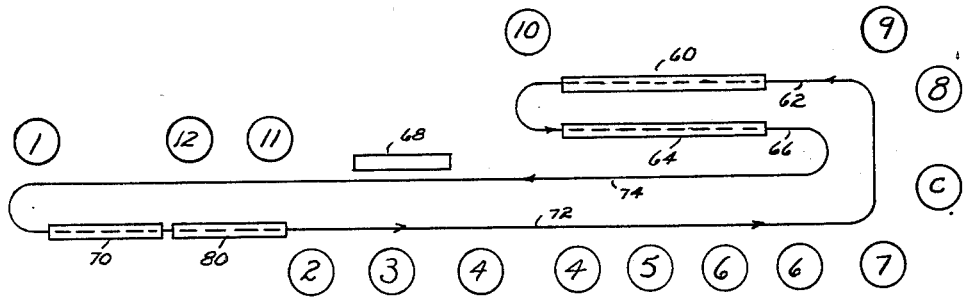
Figure 4:
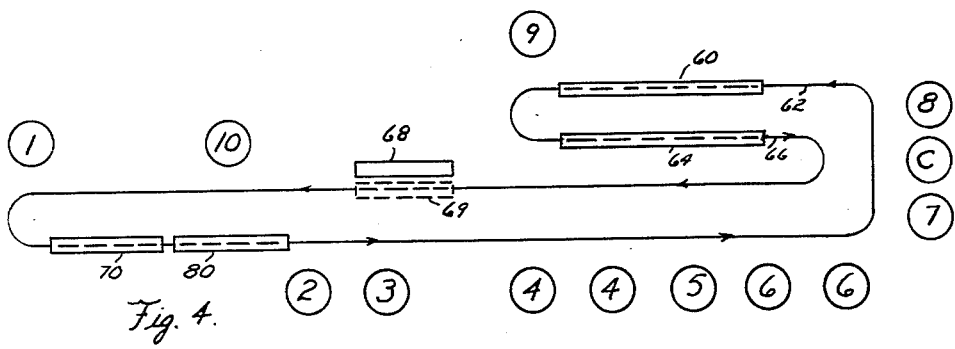
Figure 5:
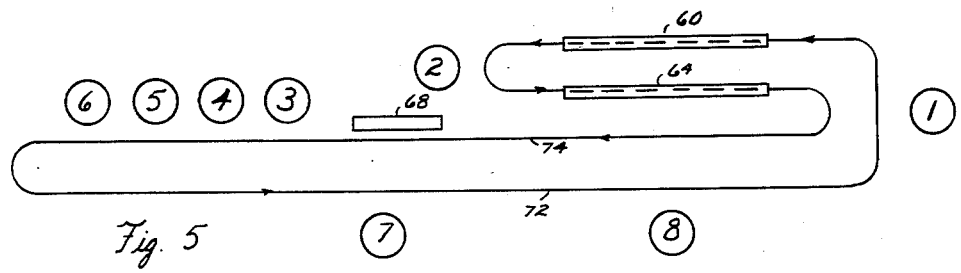

Figures 3, 4, and 5 are flow charts illustrating various types of shoe making processes which may be performed on my conveyor system.

The embodiment of my invention shown in Figures 1 and 2 includes in its general organization a support 10 upon which is mounted an endless universal conveying chain 12. This chain travels a course defined by a number of sprockets 14, 16 and 18, 20, 22, 24. The sprocket 24 is driven by a motor 26 through a reduction gear 28 and a coupling 30 to cause the chain 12 to move along its course. The other sprockets idle on their individual supports and guide the belt along its run. A number of Micarta pads 32 are carried by the chain 12 about its entire length and travel between spaced pairs of flanges 34 and 36 which extend upwardly from the frame as is clearly shown in Figure 2. Each of the pads 32 carries an upstanding post 38 which is adapted to be inserted into a recess formed in the cone portion of a conventional last. The posts 38 are secured to the Micarta pads 32 by horizontal pins 40 which extend inwardly from the edges of the pads and through the bottoms of the posts. This is suggested in Figure 2. Above each pad 32 a collar 42 is slidably carried by the post 38. A spring 44 connected between the collar 42 and the pad urges the collar downwardly on the post. Each of the collars has a downwardly extending peripheral flange 46 which cooperates with a slot 48 in the pad to retain a sole.

By moving the collar 42 upwardly against the bias of the spring 44 and inserting a sole on its edge into the slot 48 and then releasing the collar 42 so that it engages the top edge of the sole, retains the sole in place. The arrangement of the last and the sole on the post and pad respectively, is clearly illustrated in the elevation view of Figure 2.

The motor 26 through the reduction gear 28 drives the chain and the apparatus carried by it at approximately 5 to 9 feet per minute. This information coupled with the size of the conveyor as described below will reveal to the reader the time relationship between the various stations about the conveyor.

An oven or heater 60 approximately 18 feet long substantially covers the portion 62 of the belt run between the sprockets 16 and 18. A second oven 64 approximately the same length as the oven 60 covers the second portion 66 of the belt run between the sprockets 20 and 22. While the ovens 60 and 64 are disposed over the belt and define a tunnel through which the chain travels, a third heater 68 secured to the support 10 is disposed on the side of the run and is adapted to direct heat to the soles carried on the Micarta pads. An additional heater 69 parallel to the heater 68 is disposed over the belt run and is used in the manufacture of only certain types of shoes. This will be explained in detail below.

Still another heater 70 is carried on the support 10 and covers approximately 8 feet of the left side of the portion 72 of the run. This heater preferably removably mounted on the support is used in certain shoe making processes. Adjacent the heater 70 further along the run 72 is a shroud 80. This shroud also preferably removably mounted above the belt serves as a muller to direct moisture to the shoe uppers carried beneath it. Nozzles (not shown) may extend through the shroud to deliver vapor in the desired direction.

The portions 62 and 66 of the belt run are approximately 21 feet in length and the portions 72 and 74 are approximately 38 feet long. It will be noted that these portions comprise an endless belt run which is folded upon itself. This arrangement requires a minimum amount of space and permits certain operators who perform related functions on the shoes carried by the conveyor to work in close proximity to one another even though a considerable period of time elapses between the performance of their respective functions on a particular shoe. This latter advantage will be more fully appreciated when the processes practiced on the conveyor system are described in connection with Figures 3 to 5.

In Figures 3 to 5 I have disclosed three different shoe making processes which may be practiced on the conveyor illustrated in Figures 1 and 2. In the manufacture of women's high-heeled shoes, the process diagrammed in Figure 3 may be practiced. Each of the stations about the belt are identified by circled numbers and each is occupied by an operator who performs one or more of the various shoe making functions. These will be described in the order of operation. The reader should note that in the flow chart of Figure 3 the conveyor is employed after the upper is stitched together, and all of the following operations are performed on it. An operator disposed at station 1 normally assembles the counter in the upper and places the stitched upper on the Micarta pad which passes in front of it. This operation is continuously performed by the operator occupying station 1. For approximately 1 minute after the upper has been placed on the Micarta pad, the flesh side or the flesh and finished sides of the upper is subjected to preheating by the oven 70 or some other equivalent mounted on the support at the beginning of the portion 72 of the run. If the oven 70 is used, preferably the flesh side of the upper faces upwardly on the belt toward the source of heat. This preheating prepares the shoe upper for the mulling step which is automatically performed in the shroud 80 by supplying moisture in the form of vapor or steam through pipes (not shown) connected to the shroud. It is well known that a heated object will absorb more moisture than an unheated object and the preheating oven merely serves to prepare the upper for the mulling. The amount of heat supplied to the shoe upper is limited by the temperatures to which the upper may be subjected without being damaged. Heating the upper to 120 or 130° F. would not be excessive.

Preheating the upper in the manner described performs another important function in addition to preparing the upper for mulling. The temperature and moisture content of uppers brought to the conveyor may vary from day to day under the influence of factory and weather conditions. By heating each upper at the beginning of the assembling process, they are brought to a uniform temperature regardless of those external conditions. Moreover, the preheating will drive moisture from the upper material and tend to establish a uniform moisture content in all the uppers to be assembled. Thus, standard conditions are obtained at the beginning of the assembling operation.

It should also be appreciated that although the conveyor described has separate preheating and mulling chambers, in certain instances these may be combined by directing steam to the uppers which serves both to raise the temperature of the uppers and introduce the moisture which is necessary to make the upper material workable. In other instances, it may be unnecessary to preheat the upper before the moisture is directed to it. In such cases, the preheater may be eliminated.

Continuing with the description, the reader will note that after mulling, the unlasted upper reaches station 2 occupied by an operator who tacks an insole to a last, places the upper about the last, and mounts the last on the post on the Micarta pad. Ordinarily, the lasts are not carried by the posts through the muller in order to avoid any moisture being deposited on them. At stations 3 to 6, successive operators perform the pullover, side lasting, heel seating and forepart lasting, and toe lasting steps, respectively. These operators stationed approximately 5 feet apart each have enough time to perform their respective operations when the belt moves at the suggested speed set forth above. It will be noted that two operators are required for the toe lasting operation as suggested by the two stations designated by numeral 6 in the drawing. At stations 7 and 8 the lasting operation is completed by trimming the upper, and untacking the insole and by pounding the upper bottom flat and roughening its surface. These operations coupled with the crowning operation complete the preparation of the upper to receive the sole. It should be appreciated that because the moisture introduced to the upper is controlled and takes place immediately before lasting, no shrinkage occurs which would effect the lasting allowance provided for in the original pattern. Therefore, the automatic machines now available for performing many of the lasting operations can be used by the different operators to advantage. Heretofore, the lack of uniform tolerances has prevented these machines from being adopted by the industry.

The operator stationed at position 9 places the steel shank on the insole and uses fill to smooth the insole surface. This same operator may place the sole in the slot formed on the Micarta pad and secure it in place by means of the collar 42 carried by the post 38. After the operator stationed at position 9 completes his steps in the process and before the cement is applied to the bottom of the upper, the upper is again subjected to heat by the oven 60 on the portion 62 of the run. This heating performs two very important functions. First, it begins to drive the moisture from the upper which has been introduced during the mulling operation. This drying process causes the upper to shrink about the last and form the desired shape. In addition, the oven 60 preheats the overlasted margin of the upper to establish a heat reservoir in the margin. As is explained in detail in my copending applications referred to above, this preheating before the application of cement hastens the setting of the cement and enables the sole to be layed in a matter of minutes after the cement is applied. The preheating which is done at approximately 135° F. takes approximately 2 minutes in the oven 60. Thereafter, the operator at station 10 applies the cement to the periphery of the bottom. The oven 64 disposed on the portion 66 of the run reheats the shoe. The heat reservoir in the margin of the upper co-operates with the heat applied to the outer surface of the cement by the oven 64 drive the solvent from the cement and causes it to set. The heat of the oven 64 also completes the drying of the upper. This forced drying evenly shrinks the upper so that it forms an intimate fit on the last. It will be noted that the upper is force dried in two stages. Drying the upper in this manner by separate applications of heat has certain inherent advantages. During the time lapse between the first and second applications of drying heat, the outer surface of the upper, that is the finished surface against which the heat is directed has an opportunity to cool while the flesh side of the skin disposed against the last gradually increases in temperature. That is, the temperatures of the inner and outer surfaces will have an opportunity to equalize. Thus, because the exposed or outer surface of the leather has reduced in temperature, additional heat may be directed to it for a longer period without scorching or otherwise harming it.

After leaving the oven 60 the cement is allowed to cool at room temperature for approximately 2 minutes, the time required for the last to travel from the end of the oven 64 to the heater 68. During this period, the cement becomes tacky and acquires "fight strength." The sole which ordinarily has been coated with cement before it is placed on the conveyor passes by the heater 68 to reactivate its cement. The heater 68 is approximately 2½ feet long and thus applies heat to the cement on the sole for approximately 20 seconds. After the shoe passes the heater 68, the sole layer stationed at position 11 lays the sole on the upper and performs some of the preliminary cleaning operations as well. Thereafter, the operator at station 12 secures the heel to the shoe. In a full Louis process, the manufacturing operations may be completed by cementing the flap to the heel, trimming the edges, staining the edges, cleaning and lastly last pulling. In a half Louis process, the shoe may be completed by trimming and staining the edges, cleaning the shoe, and pulling the last. These last finishing operations may be performed on the line. If this is desired, the conveyor may be extended a few additional feet to make room for the operators who perform these finishing functions.

In the order of 15 minutes is required to complete the assembling of a shoe after the upper has been stitched together. Perhaps an additional 5 minutes will be required to complete the finishing operations before the last may be pulled. Conservatively, this process practiced on the conveyor system shown in Figure 1 can produce 1100 pairs of shoes a day. Approximately 70 pairs of lasts are required to produce that output. In the standard shoe making process the "last turn" is approximately 2 days and several thousand pairs of lasts will be required for the daily volume mentioned above.

In addition to greatly reducing the overhead of a shoe manufacturer by reducing the value of his last inventory to a negligible quantity, my invention has several other advantages. The area occupied by my conveyor is but a fraction of the area required to manufacture shoes by prior methods. Furthermore, uniformity of operation by operators and equipment is enforced by the constant rate at which shoes are delivered to each station about the line. Damage to the upper is substantially eliminated and little time is afforded the shoes to collect dirt during the manufacturing cycle. Each shoe stands out by itself for visual inspection throughout the manufacturing operations and the operators are required to invest a given amount of time in each shoe. This is particularly important when employees are paid under a piece rate incentive system.

I have suggested above that by folding the conveyor upon itself, certain of the stations occupied by various operators are in close proximity to one another. One example of this is the relationship between the operator at stations 10 and 11. The operator at station 11 who lays the sole and cleans the surplus cement applied to the margin of the upper is adjacent the operator at station 10 who applies the cement to the shoe bottom. Thus, the operator at station 11 can conveniently turn to the operator at station 10 with whom his work is closely associated and suggest that either too much or too little cement is being applied. In effect, the operators work as a team side by side although the functions performed by each are separated by a time interval of approximately 4 minutes.

In Figure 4 I have illustrated how low-heeled shoes made in accordance with the processes disclosed in my copending applications are manufactured on the conveyor of Figures 1 and 2. It will be noted in Figure 4 that the first eight operations are precisely the same as in the diagram of Figure 3 and the operators occupying each of these numbered stations perform precisely the same functions. However, while the operator positioned at station 9 in Figure 3 works on the shoe before it enters the heater 60, that is, that operator places the shank and fills the cavities in the insole, this operation is eliminated in the manufacture of low-heeled shoes. Thus, in the manufacture of low-heeled shoes, after the periphery of the upper has been pounded and roughed in preparation of the cementing process, the shoe passes through the oven 60 to the operator disposed at station 9 who applies the bottom cement and filler to the overlasted margin of the upper and the insole, respectively. Thereafter, the lasted upper passes through the reheat oven 64 and then cools before it reaches the heaters 68 and 69. As explained above, the heater 68 primarily directs heat to the cement coating on the sole to activate it. In the manufacture of certain shoes such as those which have low density soles, directing heat against those soles may be harmful. For example, an appreciable increase in temperature of those types of soles may cause the air cells to collapse. In such cases, the heater 68 should be either turned off or moved to a position an appreciable distance from the sole so as to reduce the amount of heat applied to it. When this is done, the heater 69 may be used to insure that the cement on the upper is tacky. After the cement on the sole or upper is conditioned by the heaters 68 and/or 69, the operator at station 10 lays the sole and removes the excess cement.

Thereafter, the heel assembling and finishing operations are performed on the shoe. Thus, the reader will appreciate that all the advantages of preheating, mulling, and again heating before and after the application of cement are retained in the manufacture of low heeled shoes. Exactly the same machinery may be used in the practice of either process and only the number of operators is changed.

In Figure 5 I have illustrated still another shoe manufacturing process which may be practiced in connection with the apparatus shown in Figures 1 and 2. Unlike the processes described above, the process diagrammed in Figure 5 does not include the lasting operation but rather is restricted to the sole laying and finishing operations. Referring now to Figure 5, the reader will note that station 1 is located not at an extreme of the endless conveyor system but rather at the fold of the system. The operator positioned at station 1 places the lasted upper on the post 38 and the sole in the slot of the pad and underneath the collar 42. That operator also applies the shank to the upper on the insole which previously has been tacked to the last. Thereafter, the lasted upper and the sole pass through oven 60 for preheating prior to the cement coating operation performed by the operator at station 2. This preheating unifies the temperature and moisture content of the uppers in the same manner as the heater 70 in the other processes, as well as preparing the upper bottom for the cement coating by establishing a heat reservoir. After the conveyor has carried the shoe to the operator at station 2 and the cement has been applied to the periphery of the bottom, the lasted upper travels through the second oven 64 which hastens the setting of the cement. Leaving the oven 64, the shoe passes through the first part of the run 74 of the conveyor and is allowed to cool at room temperature to bring the cement to its tacky state. The oven 68 thereafter directs heat primarily to the sole carried between the pad and the collar. This heat, as in the preceding processes, reactivates the cement on the sole. The operator disposed at station 3 applies the sole to the upper. At stations 4, 5, and 6, edge trimming, edge setting, and air cleaning and edge staining are carried out, respectively by several operators. After leaving the operator at station 6, the lasted shoe is carried by the conveyor to the operator at station 7 who completes the treatment of the sole. An automatic bottom polisher (not shown) which may be disposed above the conveyor and an inspector stationed at position 8 who cleans the shoes and removes them from the conveyor system complete the manufacting operations.

Having described in detail apparatus employed for carrying out the many shoe making processes, the several advantages derived from my apparatus become apparent. Particularly important in connection with the embodiments of my invention shown in Figures 3 and 4 are the controlled preheating and mulling steps. By introducing these automatic operations into the shoe making method, it is possible for the operators positioned at stations 2–6 to perform their operations without delay. It is unnecessary for them to use boxes to remull the shoes during lasting because each shoe is in precisely the right condition for lasting. In the several embodiments of my invention the number of lasts required for the manufacturing operation is radically reduced which results in a great savings in overhead to the manufacturer. By making automatic the movement of the shoes from one station to the other, the various operators can acquire a set rhythm of work and delays are eliminated.

In conclusion, two primary advantages are achieved by the use of my invention. First the product is greatly improved by the controlled manufacturing process and second, the unit cost of manufacturing is reduced. Costs are lowered not only by reducing the required inventory of lasts but also by eliminating the necessity of repairs in the packing room. The shoes manufactured on the line uniformly are delivered to the packing room without mars and in clean condition.

Having described my invention in detail, several modifications suggest themselves to those skilled in the art. Therefore, it is not my intention to limit the breadth of my invention to the specific embodiments illustrated and described. Rather, it is my intention that the scope of my invention be determined by the appended claims and their equivalents.

I claim:

1. A conveyor system for use in the manufacture of shoes comprising a support, an endless belt mounted on the support, means for moving the belt at a selected constant speed through a prescribed run on the support, a plurality of upwardly extending pins connected to the belt and adapted to retain lasts upon which shoes are to be assembled, a preheater mounted on the support and overlying a selected portion of the run of the belt and adapted to heat the overlasted margins of the uppers mounted on the lasts to establish a heat reservoir in the margins, a station disposed adjacent the run of the belt in successive operative relationship with the preheater and adapted to be occupied by an operator who coats the overlasted margins of the uppers with cement, and a reheater carried by the support in successive operative relationship with the station and disposed over the run of the belt and adapted to direct heat to the surface of cement applied to the overlasted margins of the uppers, said reheater and reservoir cooperating to condition the cement coating.

2. A device for use in the manufacture of shoes comprising a support, an endless belt movable on the support, a pin mounted on and movable with the belt and adapted to have its upper end inserted in a recess formed in a last, a collar slidable on the pin, a spring mounted about the pin and having its upper end connected to the collar and its lower end secured to the belt, said spring biasing the collar in a downwardly direction toward the belt, a recess formed in the belt adjacent the pin and adapted to receive the edge of a sole, whereby a sole may be inserted into said recess and under the collar and held in place by the bias of the spring.

3. A device as defined in claim 2 further characterized by a plurality of said pins, collars, springs and recesses being formed about the belt and spaced equidistantly about the belt.

4. A device for use in the manufacture of shoes comprising a support, a conveyor mounted on the support and adapted to travel about a prescribed substantially horizontal endless run, said run being in the form of first and second U-shaped loops disposed side by side and with the adjacent arms of the loops being connected together and the outer arms of the loops also being connected together, means secured to the conveyor and adapted to carry lasted uppers, additional means secured to the conveyor and adapted to carry the soles to be secured to the uppers, a first station disposed at the closed end of the first loop adapted to be occupied by an operator who applies a coating of cement to the bottom of the upper, a second station disposed at the second loop and adjacent the first station adapted to be occupied by an operator who lays the sole on the upper, a first heater overlying a portion of the run before the first station for establishing a heat reservoir in the upper bottom, and a second heater overlying a portion of the run between the first and second stations for directing heat to the surface of the cement and co-operating with the heat reservoir to condition the cement for sole laying.

5. A device for use in the manufacture of shoes comprising a support, a conveyor mounted on the support and adapted to travel through a prescribed run, means on the conveyor for carrying lasted uppers and soles about the run, a pair of stations adjacent the support with one of the stations adapted to be occupied by an operator who applies cement to the overlasted margin of the upper and the other station adapted to be occupied by an operator who lays the sole on the upper, a first heater disposed before said one station for establishing a heat reservoir in the overlasted margin of the upper, and a second heater disposed between the stations and extending over the run and adapted to apply heat to the surface of the cement before the upper reaches the second station, said heaters co-operating to condition the cement.

6. A device for use in the manufacture of shoes comprising a support, a conveyor mounted on and adapted to travel through a prescribed run on the support, means on the conveyor for carrying uppers to be lasted about the run, a muller overlying a portion of the run for introducing moisture into uppers carried by the conveyor, a plurality of stations disposed adjacent the conveyor and after the muller and adapted to be occupied by operators who last the uppers after they have been moisturized by the muller, and a heater disposed over the run after the plurality of stations for drying the uppers after they have been lasted.

7. A device for use in the manufacture of shoes comprising a support, an endless conveyor mounted on the support and adapted to travel through a prescribed run, means connected to the conveyor and adapted to carry lasts upon which shoes are to be assembled, a muller overlying a portion of the run for directing moisture to uppers to be assembled on the lasts, a plurality of stations disposed adjacent the conveyor and adapted to be occupied by operators who last the uppers after the uppers have received moisture from the muller, a heater disposed over the run for directing heat to the uppers, said heater adapted to dry the lasted uppers and establish a heat reservoir in the upper bottoms, an additional station disposed adjacent the conveyor and adapted to be occupied by an operator who coats the bottoms of the uppers with cement after the uppers pass beneath the heater, a second heater disposed over the run and adapted to direct heat to the surface of the coating of cement, said second heater and heat reservoir co-operating to condition the coating of cement, and yet an additional station disposed adjacent the conveyor and adapted to be occupied by an operator who lays the soles on the lasted uppers after the coatings of cement are conditioned.

References Cited in the file of this patent

UNITED STATES PATENTS

| | | |
|---|---|---|
| 1,594,688 | Perry | Aug. 3, 1926 |
| 1,854,591 | Leddy | Apr. 19, 1932 |
| 1,925,899 | Glidden et al. | Sept. 5, 1933 |
| 2,377,631 | Joyce | June 5, 1945 |
| 2,460,782 | Gialdini | Feb. 1, 1949 |